United States Patent [19]

Nelle

[11] Patent Number: 4,492,032
[45] Date of Patent: Jan. 8, 1985

[54] COUPLING ARRANGEMENT FOR LENGTH MEASURING DEVICE

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 459,375

[22] Filed: Jan. 20, 1983

[30] Foreign Application Priority Data

Jan. 22, 1982 [DE] Fed. Rep. of Germany ....... 3201887

[51] Int. Cl.³ .............................................. G01B 11/02
[52] U.S. Cl. ............................. 33/125 R; 33/125 A; 33/125 C; 356/373
[58] Field of Search ............. 33/125 R, 125 T, 125 A, 33/125 C, 1 AA; 356/373, 374, 375; 250/237 G

[56] References Cited

U.S. PATENT DOCUMENTS

| 3,910,703 | 10/1975 | Burns et al. | 356/374 |
| 4,095,903 | 6/1978 | Feichtinger | 33/125 C |
| 4,152,837 | 5/1979 | Nelle et al. | 33/125 C |
| 4,170,829 | 10/1979 | Nelle | 33/125 R |
| 4,262,423 | 4/1981 | Affa | 33/125 A |
| 4,295,742 | 10/1981 | Nelle et al. | 33/125 C |
| 4,430,799 | 2/1984 | Affa | 33/125 R |

FOREIGN PATENT DOCUMENTS

| 2219624 | 4/1973 | Fed. Rep. of Germany | 33/125 R |
| 2505586 | 8/1976 | Fed. Rep. of Germany | 33/125 R |
| 2510219 | 5/1978 | Fed. Rep. of Germany | 33/125 R |
| 2611459 | 9/1978 | Fed. Rep. of Germany | 33/125 R |
| 2810341 | 1/1980 | Fed. Rep. of Germany | 33/125 R |
| 1536365 | 2/1975 | United Kingdom | 33/125 R |

Primary Examiner—Willis Little
Attorney, Agent, or Firm—Willian, Brinks, Olds, Hofer, Gilson & Lione, Ltd.

[57] ABSTRACT

A coupling apparatus for a length measuring instrument is disclosed. The length measuring instrument includes a scale, which defines a division, and a scanning unit. The scale is connected to a first object and the scanning unit is connected to a second object movable relative to the first. The scanning unit is coupled to the second object by a coupling arrangement which is rigid in the measuring direction, and the scanning unit is guided on an auxiliary guide which functions independently of the guidance for the second object. The coupling arrangement includes a pivot joint with two degrees of rotational freedom along axes perpendicular to the measuring direction for compensation of direction errors, and a linear guide having two degrees of translatory freedom oriented perpendicularly to the measuring direction for correcting for non-parallelism between the auxiliary guide of the scanning unit and the guide of the second object.

18 Claims, 5 Drawing Figures

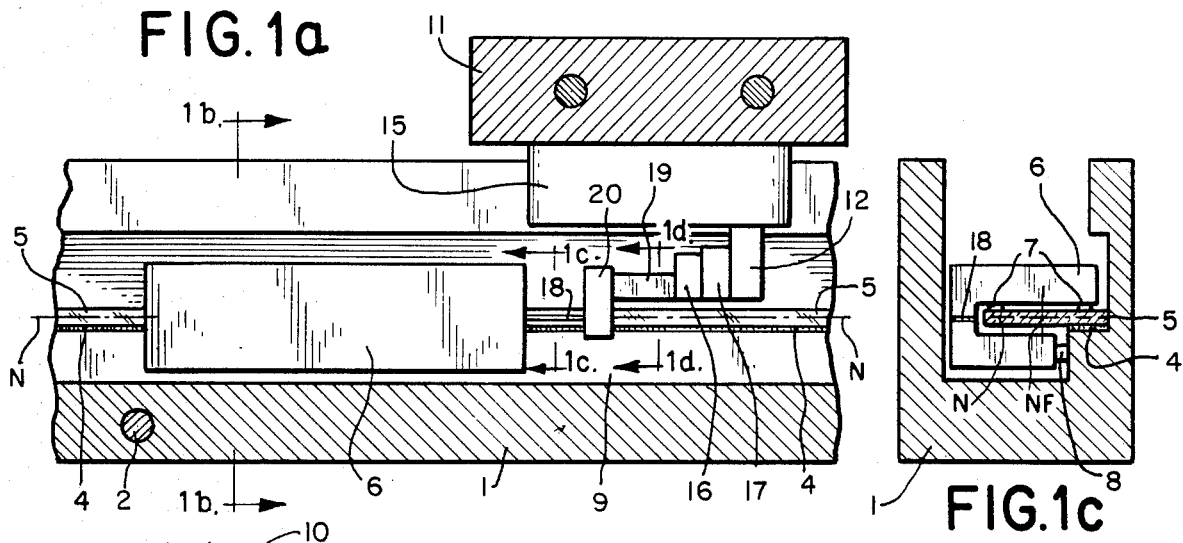
FIG.1a
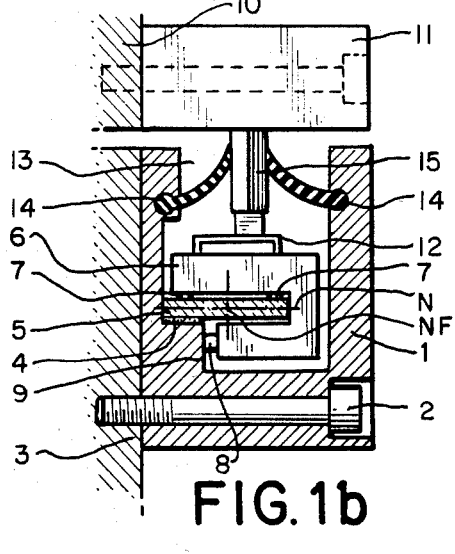
FIG.1b
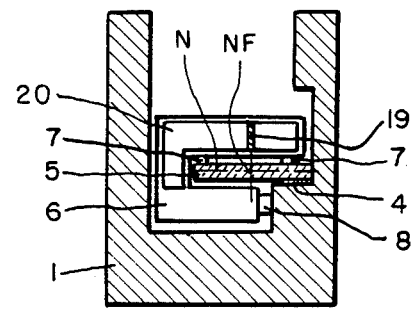
FIG.1c
FIG.1d
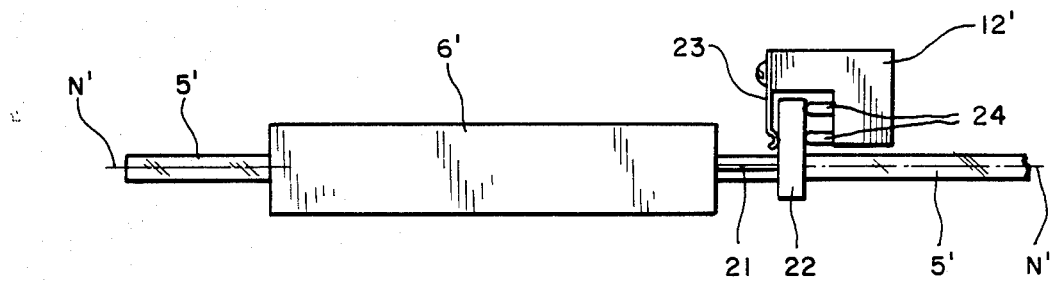
FIG.2

COUPLING ARRANGEMENT FOR LENGTH MEASURING DEVICE

BACKGROUND OF THE INVENTION

This invention relates to a length measuring device for measuring the relative position of first and second objects, of the type comprising a measuring scale which defines a measuring direction, means for connecting the scale to the first object, a scanning unit, and means for guiding the scanning unit along the scale independently of movement of the second object transverse to the scale. In particular, this invention relates to an improved coupling arrangement for such length measuring devices.

Such length measuring devices include a scanning unit that is guided by an auxiliary guide means, independently of the guidance of the object whose position is being measured, and require an articulated coupling of the scanning unit to the object being measured or to a coupling member mounted to it.

When the scale is scanned by the scanning unit, the coupling can result in measurement errors if the auxiliary guide for the scanning unit does not run parallel to the guidance of the object to be measured, or if there arise direction changes between the auxiliary guide for the scanning unit and the center line of the division of the cable. Measurement errors which result from direction changes between the auxiliary guide for the scanning unit and the center line of the division (direction errors) become negligibly small if the scanning unit is coupled to the object being measured in the neutral fiber of the scale. In this specification and the following claims, the term "neutral fiber" is used to refer to the line of intersection between the neutral plane of the scale and the plane which runs through the center line of the division of the scale perpendicularly to the neutral plane of the scale.

Measurement errors which result from a lack of parallelism between the auxiliary guide of the scanning unit and the guide of the object to be measured become negligibly small only if the coupling arrangement is constructed in such a way that it permits relative movements between the scanning unit and the object being measured in a plane perpendicular to the measurement direction, while eliminating all changes in length in the measuring direction.

In German Pat. No. 28 10 341 there is described a length measuring instrument in which the scanning unit is coupled by means of a coupling element to a follower. In this patent, the coupling element takes the form of a wire which is rigid in the measuring direction and is positioned near the neutral fiber of the scale. Deflections of the wire caused by lack of parallelism between the guide of the object to be measured and the auxiliary guide of the scanning unit result in length changes of the wire in the measurement direction. Such length changes, of course, result in measurement errors. Furthermore, since the wire does not lie in the neutral fiber of the scale, direction errors of the type described above also result in measurement errors.

German DE-OS No. 25 05 586 discloses a length measuring instrument which also includes a scanning unit that is coupled to a follower by means of a rigid wire. Simultaneously, this wire biases the scanning unit onto and against the auxiliary guide. As discussed above, this wire changes the distance between the scanning unit and the follower in response to changes in parallel movements, and in response to direction errors the pivot point does not lie in the neutral fiber of the scale. Thus, measurement errors through lack of parallelism and through direction errors are produced.

In German Pat. No. 26 11 459 there is shown a length measuring instrument in which a scanning unit is coupled in an articulated manner to the follower by means of a coupling. The coupling includes a plane surface on the scanning unit which is held in constant contact with a spherical surface of the follower by means of a spring. In this coupling arrangement, the coupling point lies outside the neutral fiber of the scale, and the distance between the coupling point and the neutral fiber is subject to fluctuations through parallel shifting between the auxiliary guide and the guide of the object to be measured, so that measurement errors can arise in consequence of direction errors.

German DE-AS No. 2 219 624 relates to a measuring instrument in which the scanning unit is coupled in an articulated manner to the follower by means of a wire which is rigid in the measuring direction. This wire is connected with a quidrilateral link, the momentary pole of which lies in the neutral fiber of the scale. With this coupling arrangement, measuring errors resulting from direction errors are avoided. However, measurement errors can result through deflections of the wire in consequence of a lack of parallelism.

German Pat. No. 25 10 219 discloses a length measuring instrument in which a scanning unit is coupled to a follower in an articulated manner. This coupling includes a first leaf spring positioned in the plane of and at the height of the neutral plane of the scale, and a second leaf spring in a plane perpendicular to the neutral plane of the scale passing through the neutral fiber of the scale. This coupling arrangement succeeds in eliminating measurement errors which might otherwise result from direction errors in guidance. However, deflections of the leaf springs in consequence of a lack of parallelism can still result in measurement errors.

SUMMARY OF THE INVENTION

The present invention is directed to a length measuring instrument of the general type described above which includes an improved coupling arrangement for coupling the scanning unit to the object to be measured, or to a follower mounted to the object to be measured. The principle advantage of this invention is that measuring errors are substantially reduced.

According to this invention, a length measuring device of the type described includes a coupling apparatus arranged to interconnect the scanning unit and the second object and to transmit movement of the second object in the measuring direction to the scanning unit. Means are included in the coupling apparatus for providing a linear guide having two degrees of translatory freedom in first and second directions perpendicular to the measuring direction. Preferably, means are also included in the coupling apparatus for providing a pivot joint having two degrees of rotary freedom about first and second axes, respectively, each of which is oriented perpendicularly to the measuring direction.

Further advantageous features of this invention are defined in the following dependent claims.

The present invention provides the important advantage that a simple coupling arrangement is provided which achieves high measurement accuracy without placing high demands on the precision of the auxiliary guide for the scanning unit or the object guide for the object to be measured. This invention achieves unusually good measuring accuracies, even when used with a scale which utilizes a division on a plane lying outside the neutral plane of the scale. Conversely, for a given level of measurement accuracy, the present invention allows the use of auxiliary guides and object guides of relatively lower precision than that required in the past. In this way, the present invention can result in significant reduction in costs of measuring instruments.

The invention itself, together with further objects and attendant advantages, will best be understood by reference to the following detailed description taken in conjunction with the accompanying drawings.

BRIEF DESCRIPTION OF THE DRAWINGS

FIG. 1a is a side view in partial cutaway of a first preferred embodiment of the present invention.

FIG. 1b is a sectional view taken along line 1b—1b of FIG. 1a.

FIG. 1c is a sectional view taken along line 1c—1c of FIG. 1a.

FIG. 1d is a sectional view taken along line 1d—1d of FIG. 1a.

FIG. 2 is a side view in simplified representation of a second preferred embodiment of the present invention.

DETAILED DESCRIPTION OF THE PRESENTLY PREFERRED EMBODIMENTS

Turning now to the drawings, FIGS. 1a through 1d show various views of a first preferred embodiment of this invention. As shown in these figures, this embodiment is a length measuring instrument which includes a housing 1 that is fastened by means such as a screw 2 to a bed 3 of a machine tool (not shown). The housing 1 defines an interior surface on which a scale 5 is mounted by means of an adhesive layer 4. This scale 5 defines a division which is scanned by a scanning unit 6. This scanning unit 6 includes (in a manner not shown) means for illuminating the scale 5 and means for detecting the intensity of light modulated by the scale 5. The scanning unit 6 is supported by means of rolls 7 on the division plane T of the scale 5, and by means of rolls 8 on a guide surface 9 defined by the housing 1. Together, the division plane T and the guide surface 9 cooperate to form an auxiliary guide for the scanning unit 6. The machine tool includes a slide piece 10 to which is fastened in any suitable manner a mounting foot 11. A follower 12 is secured to the mounting foot 11 and is connected to the scanning unit 6 by means of a coupling arrangement. The housing 1 defines a slit opening 13 extending along the length of the scale 5. This slit opening 13 is closed by means of resilient sealing lips 14 mounted to the housing 1. The follower 12 includes an intermediate section 15 which is sword shaped and is adapted to cooperate with the sealing lips 14 to seal the interior of the housing 1.

In accordance with this invention, the coupling arrangement between the scanning unit 6 and the follower 12 includes means for compensating for a lack of parallelism between the auxiliary guide of the scanning unit 6 and the guide (not shown) of the slide piece 10. This compensating means includes two flat plates 16, 17 which are magnetically biased together to form a cross guide. This cross guide permits only two dimensional translatory movement between the two flat plates 16, 17. The plate 17 is mounted to the follower 12 such that the surface of the plate 17 adjacent the plate 16 is flat and oriented perpendicularly to the measuring direction. Thus, the plate 16 is free to slide on the plate 17 in a plane which is perpendicular to the measuring direction as necessary to compensate for guidance errors due to nonparallelism. The coupling arrangement shown in FIGS. 1a–1d also includes means for compensating direction errors between the guide direction of the scanning unit 6 on the auxiliary guide and the center line of the division of the scale 5. In the division plate T and in a plane perpendicular to the division plane T there are provided two level pivot joints in the form of two leaf springs 18, 19 which are jointed to one another by means of a plate 20. The leaf spring 18 is joined between the scanning unit 6 and the plate 20 and runs with its plane at the height of the neutral plane N of the scale 5. The leaf spring 19 is connected between the plate 16 and the plate 20 and is oriented with its plane perpendicular to the neutral plane N of the scale 5 and in the plane which passes through the center line of the division of the scale 5. This latter plane intersects the neutral plane N of the scale in the neutral fiber NF of the scale 5. The leaf springs 18, 19 in this way make possible rotary movements about two pivot axes which intersect in the neutral fiber NF of the scale 5.

Turning now to FIG. 2, a second preferred embodiment of this invention includes a coupling arrangement between a scanning unit 6' and a follower 12'. This coupling arrangement includes a leaf spring 21 which is positioned with its plane at the height of the neutral plane N' of the scale 5' and is connected between the scanning unit 6' and a flat plate 22 of hard metal. The flat plate 22 defines a bearing surface which is oriented perpendicularly to the measuring direction and is held by means of a spring 23 in constant sliding contact with two spherical surfaces 24 defined by the follower 12'. These two spherical surfaces 24 lie in the plane perpendicular to the neutral plane N' of the scale 5' which passes through the neutral fiber of the scale 5'. The spring 23, plate 22, and spherical bearing surfaces 24 are arranged such that the plate 22 is capable of two dimensional translatory movement in a plane perpendicular to the measuring direction. In this way, compensation is made for nonparallelism between the auxiliary guide for the scale 6' and the guide for the object coupled to the follower 12' to be measured. In addition, the coupling arrangement of FIG. 2 allows a rotary movement about an axis of rotation perpendicular to the measuring direction and perpendicular to the neutral plane N' of the scale 5' about the spherical bearing surfaces 24. Rotary movement about this axis of rotation acts to compensate for direction errors that would otherwise be produced by rotary movement of the leaf spring 21 about its pivot axis (axis of rotation) which is situated in the neutral plane N' of the scale 5', perpendicular to the measuring direction.

A wide variety of changes and modifications can be made to the preferred embodiments described above. For example, the pivot joint with two rotary degrees of freedom can be formed by a spatial pivot joint, such as a short length of wire for example, in which the length of the wire is chosen such that only angular movements are possible. Furthermore, at least one of the two plates 16,17 can be made of a plastic bound magnetic material. Of course, the two plates 16,17 can be held together in constant sliding contact by a spring arrangement similar to the one shown in FIG. 2.

Furthermore, the flat plate 22 may be made of a plastic bound magnetic material and the spherical surfaces 21 may be made of steel such that the plate 22 is held in constant sliding contact against the spherical surfaces 24 by magnetic forces. In addition, the leaf springs 18,19 together with the plates 16,20 and at least a portion of the scanning unit 6 can be formed in one piece of the same material. Similarly, the leaf spring 21 together with the plate 22 and at least a portion of the scanning unit 6' can be formed in one piece of the same material. The positions of the leaf springs 18,19 can be interchanged with one another if desired.

It should be understood in view of the foregoing discussion that a wide range of further changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a length measuring device for measuring the relative position of first and second objects, of the type comprising a measuring scale which defines a measuring direction, means for connecting the scale to the first object, a scanning unit, and means for guiding the scanning unit along the scale independently of movement of the second object transverse to the scale, the improvement comprising:
   a coupling apparatus arranged to interconnect the scanning unit and the second object and to transmit movement of the second object in the measuring direction to the scanning unit; and
   a linear guide, included in the coupling apparatus and having two degrees of translatory freedom in first and second directions perpendicular to the measuring direction, said linear guide connected between the scanning unit and the second object such that the scanning unit is movable with respect to the second object in a plane perpendicular to the measuring direction.

2. The invention of claim 1 further comprising:
   means, included in the coupling apparatus, for providing a pivot joint having two degrees of rotary freedom about first and second axes, respectively, each of which is oriented perpendicularly to the measuring direction.

3. The invention of claim 2 wherein the means for providing a pivot joint comprises two flat pivot joins which define respective first and second pivot axes aligned with the first and second axes, respectively, wherein the scale defines a neutral fiber and the first and second pivot axes are oriented to intersect the neutral fiber.

4. The invention of claim 3 wherein each of the two flat pivot joints comprises a respective leaf spring.

5. The invention of claim 4 wherein each of the leaf springs and at least a portion of the scanning unit are formed in one piece of the same material.

6. In a length measuring device for measuring the relative position of first and second objects, of the type comprising a measuring scale which defines a measuring direction, means for connecting the scale to the first object, a scanning unit, and means for guiding the scanning unit along the scale independently of movement of the second object transverse to the scale, the improvement comprising:
   a coupling apparatus arranged to interconnect the scanning unit and the second object and to transmit movement of the second object in the measuring direction to the scanning unit; and
   means, included in the coupling apparatus, for providing a linear guide having two degrees of translatory freedom in first and second directions perpendicular to the mmeasuring direction;
   said scale defining a neutral plane and a neutral fiber; and
   said means for providing a linear guide comprising:
   first and second flat plates positioned adjacent one another; and
   means for holding the first plate in sliding contact with the second plate.

7. The invention of claim 6 wherein the holding means comprises at least one magnet oriented to hold the first plate in sliding contact with the second plate by magnetic force.

8. The invention of claim 6 wherein the holding means comprises means for exerting a spring force to hold the first plate in sliding contact with the second plate.

9. The invention of claim 6 wherein at least one of the plates comprises a plastic bound magnetic material.

10. The invention of claim 1 wherein the linear guide comprises a flat pivot joint.

11. In a length measuring device for measuring the relative position of first and second objects, of the type comprising a measuring scale which defines a measuring direction, means for connecting the scale to the first object, a scanning unit, and means for guiding the scanning unit along the scale independently of movement of the second object transverse to the scale, the improvement comprising:
   a coupling apparatus arranged to interconnect the scanning unit and the second object and to transmit movement of the second object in the measuring direction to the scanning unit; and
   means, included in the coupling apparatus, for providing a linear guide having two degrees of translatory freedom in first and second directions perpendicular to the measuring direction;
   said scale defining a neutral plane and a neutral fiber; and
   said means for providing a linear guide comprising:
   a planar leaf spring mounted to the scanning unit and disposed with the plane of the spring at the height of the neutral plane of the scale;
   a flat plate mounted to the leaf spring, said plate defining a flat bearing surface oriented perpendicularly to the measuring direction;
   a follower which defines two spherical bearing surfaces which lie in a plane which contains the neutral fiber and is perpendicular to the neutral plane of the scale; and
   means for maintaining the spherical bearing surfaces in constant, sliding contact with the flat bearing surface.

12. The invention of claim 11 wherein the plate comprises a hard metal and the two spherical bearing surfaces comprise a steel.

13. The invention of claim 11 wherein the maintaining means comprises a magnet effective to generate a magnetic force which biases the spherical and flat bearing surfaces together.

14. The invention of claim 11 wherein the maintaining means comprises a spring disposed to bias the spherical and flat bearing surfaces together.

15. The invention of claim 11 wherein the leaf spring, the flat plate, and at least a portion of the scanning unit are formed in one piece of the same material.

16. In a length measuring device for measuring the relative position of first and second objects, of the type comprising a measuring scale which defines a measuring direction, a neutral plane, and a neutral fiber, means for connecting the scale to the first object, a scanning unit, and means for guiding the scanning unit along the scale independently of movement of the second object transverse to the scale, the improvement comprising:
- a first block;
- a second block which defines a first flat bearing surface;
- a first leaf spring disposed in the neutral plane of the scale and coupled between the scanning unit and the first block;
- a second leaf spring disposed in a plane which passes through the neutral fiber and is perpendicular to the neutral plane of the scale, and coupled between the first block and the second block such that the first bearing surface is perpendicular to the measuring direction;
- means, coupled to the second object, for defining a second bearing surface adjacent and parallel to the first bearing surface; and
- means for biasing the first and second bearing surfaces together to hold the first and second bearing surfaces in sliding contact.

17. The invention of claim 16 wherein the biasing means comprises at least one magnet positioned to generate a magnetic force which biases the first and second bearing surfaces together.

18. In a length measuring device for measuring the relative position of first and second objects, of the type comprising a measuring scale which defines a measuring direction, a neutral plane, and a neutral fiber, means for connecting the scale to the first object, a scanning unit, and means for guiding the scanning unit along the scale independently of movement of the second object transverse to the scale, the improvement comprising:
- a block which defines a flat bearing surface;
- a leaf spring mounted between the block and the scanning unit and disposed in the neutral plane of the scale to orient the block such that the bearing surface is perpendicular to the measuring direction;
- a follower, coupled to the second object, which defines two spherical bearing surfaces disposed in a line perpendicular to both the measuring direction and the neutral plane of the scale, and coplanar with the neutral fiber of the scale; and
- means for biasing the flat bearing surface of the block against the spherical bearing surfaces to hold the flat and spherical bearing surfaces in sliding contact.

* * * * *